(12) United States Patent
Haataja et al.

(10) Patent No.: US 8,160,961 B1
(45) Date of Patent: Apr. 17, 2012

(54) CHARGING FOR PREPAID SUBSCRIBERS IN A TELECOMMUNICATIONS SYSTEM

(75) Inventors: Timo Haataja, Soborg (DK); Lars Andresen, Hellerup (DK)

(73) Assignee: Nokia Corporation, Espoo (FI)

( * ) Notice: Subject to any disclaimer, the term of this patent is extended or adjusted under 35 U.S.C. 154(b) by 1565 days.

(21) Appl. No.: 10/069,403

(22) PCT Filed: Sep. 1, 2000

(86) PCT No.: PCT/FI00/00742
§ 371 (c)(1), (2), (4) Date: Feb. 26, 2002

(87) PCT Pub. No.: WO01/17222
PCT Pub. Date: Mar. 8, 2001

(30) Foreign Application Priority Data

Sep. 2, 1999 (FI) .................................... 19991874

(51) Int. Cl.
*G06Q 40/00* (2006.01)
(52) U.S. Cl. .......................................... 705/40; 705/41
(58) Field of Classification Search ............... 705/10–44
See application file for complete search history.

(56) References Cited

U.S. PATENT DOCUMENTS

| | | | | |
|---|---|---|---|---|
| 5,708,422 A | * | 1/1998 | Blonder et al. | 340/5.41 |
| 5,799,072 A | * | 8/1998 | Vulcan et al. | 379/114.02 |
| 5,825,863 A | * | 10/1998 | Walker | 379/114.2 |
| 5,909,485 A | | 6/1999 | Martin et al. | 379/144 |
| 5,960,416 A | * | 9/1999 | Block | 705/34 |
| 6,226,364 B1 | * | 5/2001 | O'Neil | 379/114.2 |

FOREIGN PATENT DOCUMENTS

| | | |
|---|---|---|
| EP | 572 991 | 12/1993 |
| EP | 0 779 750 A2 | 6/1997 |
| GB | 2 322 771 | 9/1998 |
| WO | WO-98/41038 | 9/1998 |
| WO | WO 98/57488 | 12/1998 |
| WO | WO 99/27723 | 6/1999 |

OTHER PUBLICATIONS

Global Wireless, v 1, n5, p13+, Summer 1998, "Prepaid influence continues to grow (Prepaid cellular service is growing success; 40% of new cellular users join prepaid plans; total world subscribers using prepaid options is estimated at about 26 mil)".*
International Telecommunication Union; Q.1210: Q.1210-series intelligent network Recommendation structure (Oct. 1995).
International Telecommunication Union; Q.1211: Introduction to intelligent network capability set 1 (Mar. 1993).
International Telecommunication Union; Q.1213: Global functional plane for intelligent network CS-1 (Oct. 1995).
International Telecommunication Union; Q.1214: Distributed functional plane for intelligent network CS-1 (Oct. 1995).
International Telecommunication Union; Q.1215: Physical plane for intelligent network CS-1 (Oct. 1995).

(Continued)

*Primary Examiner* — Frantzy Poinvil
(74) *Attorney, Agent, or Firm* — Harrington & Smith

(57) ABSTRACT

To be able to customize subscriber charging in a telecommunications system, at least two different kinds of tariff models (TM) are defined, each model containing a tariff scheme defining how to charge a call. The tariff model to be used with a subscriber is directly or indirectly indicated in subscriber information (SI).

23 Claims, 3 Drawing Sheets

OTHER PUBLICATIONS

International Telecommunication Union; Q.1218: Interface Recommendation for intelligent network CS-1 (Sep. 1997).

International Telecommunication Union; Q.1219: Intelligent network user's guide for Capability Set 1 (Apr. 1994).

International Telecommunication Union; Q.1220: Q.1220-series Intelligent Network Capability Set 2 Recommendation structure (Sep. 1997).

International Telecommunication Union; Q.1221: Introduction to Intelligent Network Capability Set 2 (Sep. 1997).

International Telecommunication Union; Q.1222: Service plane for Intelligent Network Capability Set 2 (Sep. 1997).

International Telecommunication Union; Q.1223: Global functional plane for intelligent network Capability Set 2 (Sep. 1997).

International Telecommunication Union; Q.1224: Distributed functional plane for intelligent network Capability Set 2 This Recommendation is published in three fascicles (Sep. 1997).

International Telecommunication Union; Q.1225: Physical plane for Intelligent Network Capability Set 2 (Sep. 1997).

International Telecommunication Union, Q.1228: Interface Recommendation for intelligent network Capability Set 2 (Sep. 1997).

International Telecommunication Union; Q.1229: Intelligent Network user's guide for Capability Set 2 This Recommendation is published in 5 fascicles(Mar. 1999).

V interfaces at the digital Local Exchange (LE); V5.2 interface for the support of Access Network (AN); Part 1: V5.2 interface specification; ETSI EN 300 347-1 V2.2.2 (Dec. 1999).

* cited by examiner

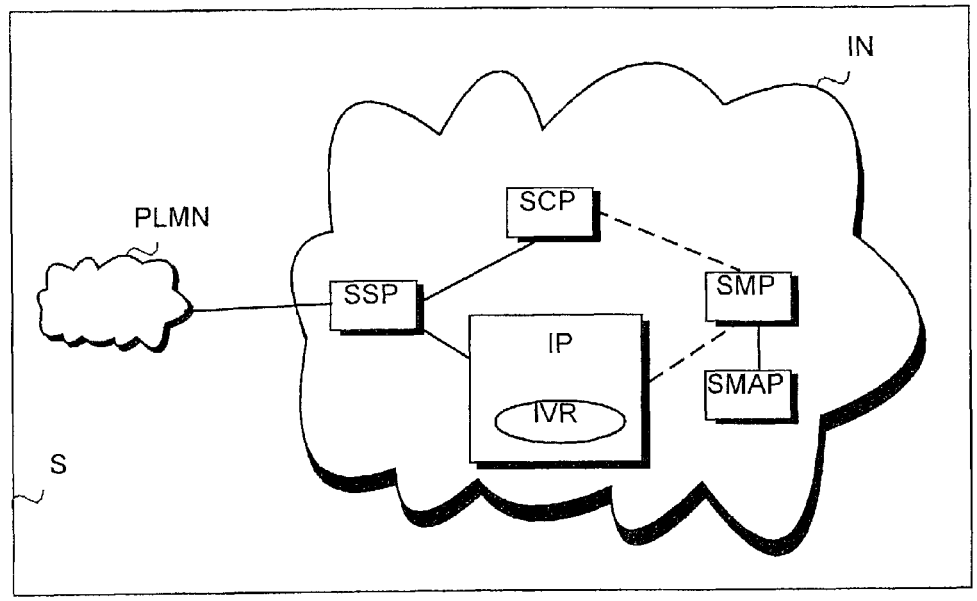

ureCHARGING FOR PREPAID SUBSCRIBERS IN A TELECOMMUNICATIONS SYSTEM

This is a National Stage application of International Application No. PCT/FI00/00742, which was filed on Sep. 1, 2000, which designated the U.S., and was filed in the English language.

BACKGROUND OF THE INVENTION

The present invention relates to a method and an equipment for enabling versatile charging in telecommunications systems and especially more versatile charging for prepaid subscribers. A prepaid subscriber refers to a subscriber using prepaid subscription, i.e. a subscriber who has paid in advance.

In mobile telecommunications systems, such as the pan-European digital mobile communications system GSM (Global System for Mobile Communications), call prices depend usually on the time when the call is made. To be able to offer more versatile charging possibilities some operators offer prepaid service for subscribers. A prepaid service is a service where a subscriber pays in advance his calls by buying vouchers. The prepaid service logic and prepaid service data are stored in the system. A prepaid SIM (Subscriber Identity Module) card comprises an MSISDN number which is associated with the prepaid service data, including the subscriber's credit, in the system. A prepaid service allows payment of a telephone bill in advance or setting an upper limit for the telephone bills. As another benefit, the prepaid service enable roaming subscribers to pay their local calls at local tariffs, whereas the use of the SIM card of their home service provider results in paying international tariffs to their home network and back.

Usually a prepaid subscription is activated and money added to subscriber's prepaid account by means of vouchers. Some of the service providers sell different types of vouchers, which differ from each other e.g. in the number of call units and the time the call time bought is valid. However, the calls are charged in the same way regardless of what kind of a voucher is used.

The above described possibilities for charging calls are insufficient, since the needs of mobile subscribers and their use of their mobile stations are becoming more and more differentiated. There are users making lot of calls during office hours whereas some other users call seldom and during evenings, for example. The charging of calls has to be diversified correspondingly.

DISCLOSURE OF THE INVENTION

The object of the invention is to provide versatile charging possibilities that are easy to maintain and define by the operator. The object of the invention is achieved with methods, a system, a network element and databases which are characterized in what is disclosed in the independent claims. The preferred embodiments of the invention are set forth in the dependent claims.

The invention is based on defining at least two different kinds of tariff models and associating a subscriber's information directly or indirectly with a tariff model which is used when the subscriber makes a call. With tariff models the charging of subscribers is easily diversified.

The advantages of the invention are that the service provider can customize the charging very easily and for example direct some users to call during times when the network is not very loaded.

In one embodiment of the invention, where the prepaid service is used, each voucher type has a tariff model. The further advantage of this embodiment is that a subscriber can change his tariff model by changing the voucher type he is using.

In another embodiment of the invention, where the prepaid service is used, voucher types allowed for subscribers are defined. The further advantage of this embodiment is that the operator can restrict the subscriber's freedom to choose a tariff model to be used.

BRIEF DESCRIPTION OF THE FIGURES

The invention will be described in further detail in the following by means of preferred embodiments with reference to the accompanying drawings, in which FIG. 1 is a block diagram showing some relevant network elements in a first preferred embodiment of the invention;

FIG. 2 is a block diagram showing some relevant elements of the SMP in the first preferred embodiment of the invention;

DETAILED DESCRIPTION OF THE INVENTION

Figure 3:
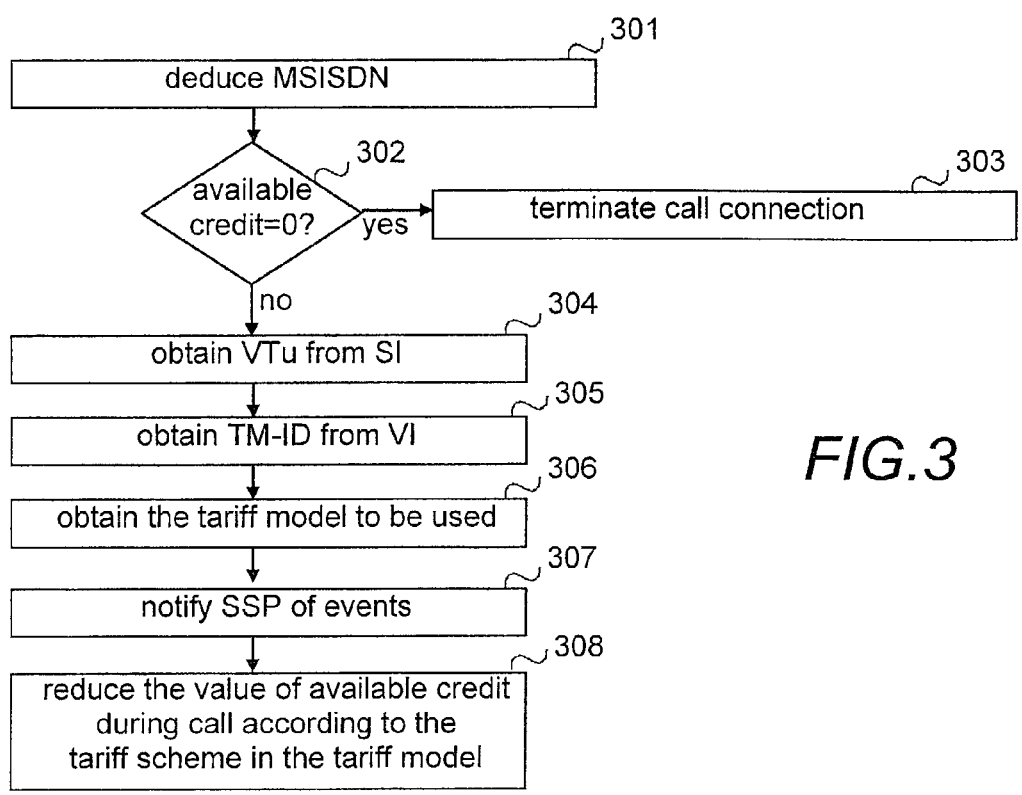
FIG. 3 is a flow chart illustrating charging in the first preferred embodiment.

FIG. 1 is a block diagram of a telecommunications system S equipped with an arrangement according to a first preferred embodiment of the invention. The telecommunications network is assumed to be a public land mobile network PLMN, without, however, limiting the invention to that kind of particular network. The invention can be used in any telecommunications systems where subscribers have subscription information stored in the system and the subscription information is used when calls are charged.

The embodiment illustrated in FIG. 1 makes use of Intelligent Network technology. An intelligent network IN is able to provide a subscriber of a telecommunications network, such as a wired network or a mobile telephone network, with a plurality of services. An example of such an intelligent network is described in recommendations of the ITU-T Q-1200 series, of which Q-1210 to Q-1219 define a set of features known as CS-1 (Capability Set 1), and correspondingly, Q-1220 to Q-1229 define a set of features CS-2. The invention and its background will be described by the terminology of recommendation ETS 300 374-1 CoreINAP, but the invention can also be employed in intelligent networks implemented according to other intelligent network standards.

FIG. 1 shows some elements of an intelligent network which are relevant to the understanding of the invention, such as what are known as intelligent peripherals IP. Usually an IP is associated with a specialized resource function SRF which is an interface for network mechanisms associated with interaction with a subscriber. Thus an IP may comprise e.g. more advanced speech handling functions than do exchanges in general. The IVR application is usually located in the IP. The IVR application, also called the PrePaid service IVR application, is an interactive voice response application that allows the subscriber to make a deposit (add money, recharge) into his PrePaid SIM account by entering the identification number of a prepaid voucher. The IP is connected to an SSP using for example ISUP (ISDN User Part) signalling and one or more voice transports.

The SSP (Service Switching Point) is a network element performing service switching function (SSF). The SSP may be a mobile service switching centre MSC, which includes the SSF. The SSF is an interface between a conventional call control function CCF and the service control function SCF of an intelligent network. The network element performing the SCF is called a service control point SCP. An intelligent network service is produced by the service switching point SSP inquiring instructions from the service control point SCP by means of messages to be transmitted across the SSP/SCP interface upon the encounter of detection points associated with the service. In association with an intelligent network service, a service logic program is started at the service control point SCP, the operation of the program determining the messages transmitted by the SCP to the SSP at each stage of a call. During one call there may be several service logic programs started and ended. The service logic program handling a prepaid call runs during the whole call, since it controls credit updating. Usually the SCP controls the charging and adjusts the charging on the basis of information it gets from the SSP. The credit updating according to the invention is discussed in greater detail in FIG. 3.

However, usually the SCP is not used in the service logic of the Prepaid SIM IVR recharge application, i.e. calls to the IVR are routed by the CCF directly to the IVR on the basis of the service number which the subscriber has dialed in order to recharge (deposit).

In the example illustrated in FIG. 1, prepaid subscriber information, information about vouchers, prepaid profile definitions and tariff models are in a database located in a service management point SMP as is described in greater detail in FIG. 2. Alternatively, they may be located in different databases and/or in some other network element, like a home location register HLR (not shown in FIG. 1). The database may also be a decentralized database. The IVR interfaces the SMP database through a service management interface SMI. The SMP and the IP may be connected e.g. through a local area network (LAN) using TCP/IP (Transmission Control Protocol/Internet Protocol). The connection between the IP and the SMP, illustrated by a dashed line, represents only management connection without any signalling connection.

The service management access point SMAP provides some selected users, such as service providers and network operators, with access to the service data of the service management point SMP through a public telephone network, such as the PSTN or the ISDN, a cellular radio network (such as the GSM) or a public data network (X.25, the Internet) and an open interface. The SMAP interacts directly with the SMP. Furthermore, the SMAP can provide access to a network element of another telecommunications network. The operator can define and redefine tariff models via the SMAP. The SMAP is described in greater detail in PCT patent application WO98/41038 which is incorporated herein by reference.

Network operators and service providers are nowadays separated. A service provider buys the required bearer services from a network operator. A network operator may also be a service provider. An operator may also have multiple service providers.

FIG. 2 is a block diagram showing the relevant parts of the SMP in the first preferred embodiment of the invention. In the first preferred embodiment of the invention, each voucher type VT is associated with one tariff model TM-ID and subscriber information SI comprises information about the voucher type currently in use, VTu. With this information, the tariff to be used is easily found when needed. Besides the voucher type VT and the tariff model identifier TM-ID, voucher information VI may comprise also other information like a CV indicating how many months the credit is valid for recharge and a voucher price VP as is illustrated in the example in FIG. 2.

The tariff model TM comprises a tariff model identifier ID, weekday definitions WD, time definitions T, prices per minute P and in the example illustrated in FIG. 2, also prefixes Pr. With prefixes it is possible to have different call prices within one tariff model to different telephone numbers. The price without a prefix is used when the dialed number does not match any prefix defined in caller's tariff model. Each tariff model comprises preferably a unique tariff scheme. For example tariff model 1 is for persons normally calling during office hours whereas tariff model 2 is for persons calling in the evenings and weekends. In the tariff model 1 the possibility to differentiate call prices by a prefix is used: certain calls to/in Finland are cheaper than other calls during office hours. The tariff models illustrated in FIG. 2 are purely illustrative. The service provider can define various tariff models, change definitions and add new models. The tariff model may have different prices for data calls, multimedia calls or messages, short messages, or prices for calls where also the called person is charged, for example. The simplest tariff model is a model where one price is used all the time.

Subscriber information SI comprises in the first preferred embodiment subscribers' phone numbers MSISDNs, each associated with a profile identifier P-ID and a voucher type currently in use VTu. Instead of or in addition to MSISDNs, subscribers identifiers IMSIs may also be used in other embodiments. The profile identifier identifies the profile whose information is to be used with this subscriber.

Predefined profile information PP comprises at least a profile identifier P-ID and voucher types allowed to that profile, VTa. With the allowed voucher types VTa, the service provider can restrict the vouchers the subscriber is allowed to use. One subscriber may use all kind of vouchers, whereas another subscriber may be restricted to only one voucher type. These allowed voucher types are used during recharges as illustrated in greater detail in FIG. 4. The predefined profile may also comprise values for different kind of prepaid service attributes, for example an indication how to calculate a new credit when a subscriber deposits.

In the second preferred embodiment of the invention, all subscribers are required to use only one kind of tariffing and only one kind of voucher. Thus the allowed voucher types VTa comprise only one voucher type. The tariff model identifier TM-ID is either in the voucher information (as in FIG. 2) or in the prepaid profile definitions. In the second embodiment there is no need to store information indicating the currently used profile VTu in the subscriber information SI since it is the same as the only allowed voucher type VTa in the prepaid profile information.

The third preferred embodiment of the invention differs from the first preferred embodiment in that no prepaid profiles are used. Thus all subscribers can use all kinds of vouchers. Naturally, in the third preferred embodiment of the invention no prepaid profile information is maintained.

In the fourth preferred embodiment of the invention, all subscribers are required to use only one kind of tariffing but some of them are allowed to use different kind of vouchers. This embodiment differs from the first embodiment of the invention in that the tariff model identifier is defined either in the prepaid profile information or in the subscriber information, not in the voucher information. In this embodiment the difference between vouchers could be the price of the vouchers. Also subscribers having a different prepaid profile can have different kinds of charging, even if they use the same voucher type.

In the fifth preferred embodiment, no prepaid profiles are used and the subscriber information SI also comprises information about allowed voucher types VTa.

In another embodiment of the invention one tariff model is defined to be a default model which is used when no other model is defined for that subscriber or voucher. The advantage of this embodiment is that there is no need to add a tariff model to old subscriber information or voucher information.

These embodiments are only illustrative and different kinds of further embodiments can be built by taking a single feature or features of them and combining them.

FIG. 3 is a flow chart illustrating an example of how the charging base is determined according to the first preferred embodiment of the invention. In this example it will be assumed that the IN and, more precisely, the SCP is responsible for keeping track of the available credit of the prepaid subscriber, but this is not necessary to the invention. It is also possible that it is the MSC (SSP) that keeps track of the available credit of the prepaid subscriber. Another assumption, made here, is that the SCP stores the available credit to an IN database called Service Data Point (SDP, not shown separately in FIG. 1) which is a database for the SCP. It is also assumed that the call made here is not an emergency call.

Referring to FIG. 3, a prepaid subscriber has dialed numbers indicating that he wants to make a call which is charged from him. The SSP notices that the caller is a prepaid caller and sends a prepaid service request to the SCP. In step 301, the SCP deduces from the service request the caller's identification, which in the first preferred embodiment of the invention is the MSISDN. In step 302, it is checked if the subscriber's available credit is zero, i.e. has he used all his money. Since the available credit is stored in the SDP, it did not have to be transferred to the SCP. If the available credit is zero, call connection is terminated in step 303. In some other embodiments some other credit limit than zero may be used.

If a subscriber still has some money on his account, the SCP obtains in step 304 the voucher type currently in use, VTu, from the subscriber information SI located in the SMP on the basis of the MSISDN. The SCP then obtains in step 305 the tariff model identifier TM-ID from voucher information VI located in the SMP on the basis of VTu. In step 306 the tariff scheme in the tariff model is obtained from the tariff model information TM located in the SMP on the basis of the TM-ID.

The SCP then notifies in step 307 the switching point (SSP) by sending an instruction message of the events which affect call price formation and are to be reported by the switching point (SSP) to the control point (SCP) in a report message.

When the call is connected, the SCP reduces in step 308 the value of available credit during the call according to the tariff scheme in the tariff model. Naturally, the SCP adapts, when needed, reduction of the available credit according to the messages received from the SSP.

In other embodiments of the invention described in FIG. 2, the tariff model to be used may be searched differently from what is described above in FIG. 3 depending where and what information is required to find out the tariff model.

In some other embodiments of the invention the SCP may send the MSISDN to the SMP, and SMP carries out the data search described in steps 304-306 and sends as a response to the SCP the tariff scheme in the tariff model.

Figure 4:
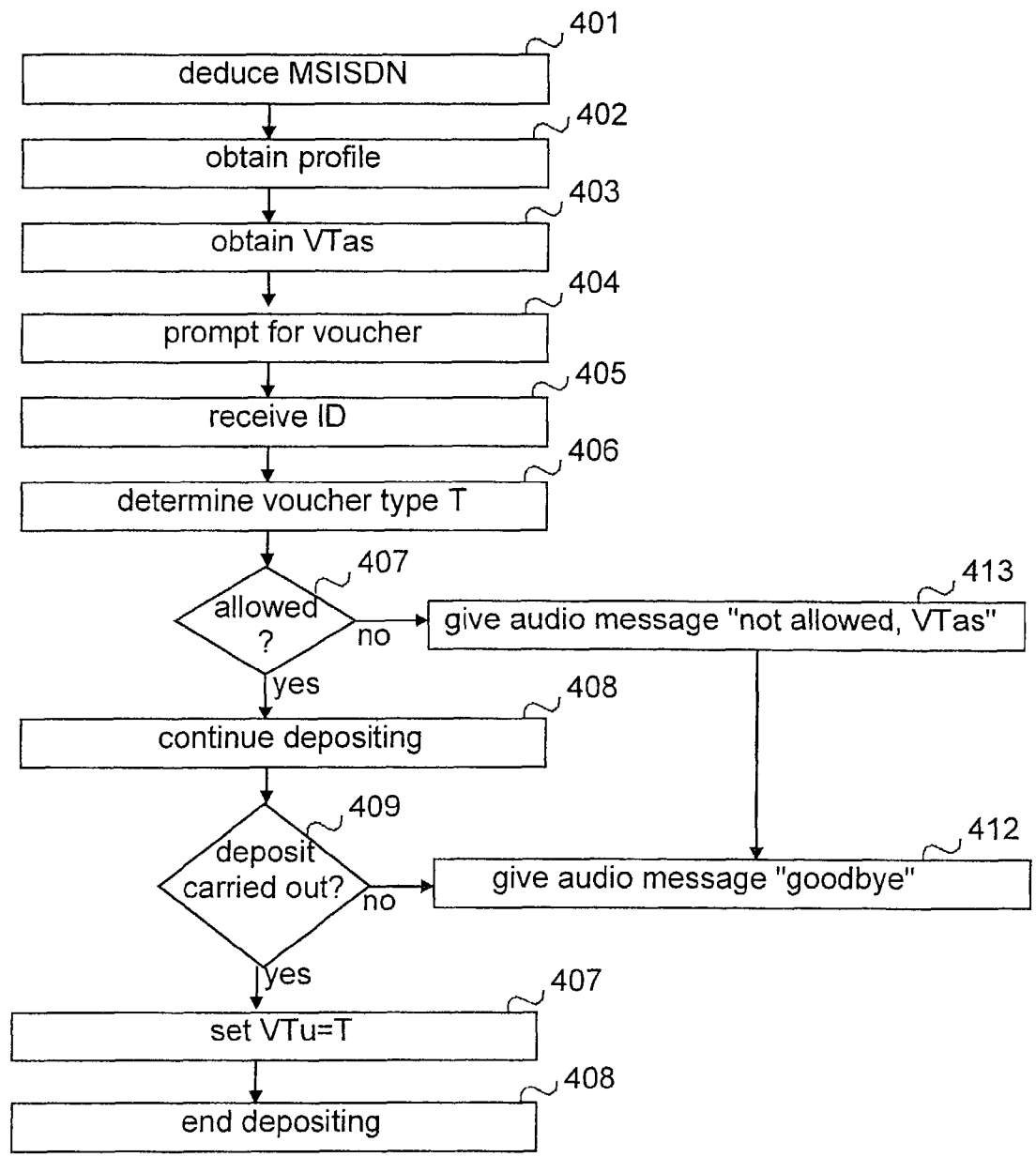
FIG. 4 is a flow chart illustrating depositing in the first preferred embodiment.

FIG. 4 is a flow chart illustrating the depositing in the first preferred embodiment of the invention. In this example it is assumed that the IVR is taking care of the depositing and the voucher is assumed to be valid. In the example illustrated in FIG. 4, it is also assumed that the voucher identification numbers are used to identify the type of the voucher, so that e.g. when two types of vouchers are used, the identification numbers on list 1 are of type 1 and the missing numbers are of type 2. It is, however, irrelevant to the invention how the type of the voucher is determined.

Referring to FIG. 4, a subscriber has bought a voucher from a shop, called to the IVR and selected to deposit the voucher. The subscriber is assumed to be a prepaid subscriber, otherwise he cannot deposit. It is also assumed that the IVR checks at the beginning of the call if the caller is a prepaid subscriber, and if not, then the call is disconnected or connected to customer service.

FIG. 4 begins in step 401, where the IVR deduces the caller's identification, which is in the first preferred embodiment the MSISDN. On the basis of the MSISDN the IVR obtains, in step 402, the caller's prepaid profile identifier P-ID from the subscriber information SI located in the SMP. On the basis of profile identifier P-ID, the IVR obtains, in step 403, the allowed voucher types VTas from the predefined profile information PP located in the SMP. In embodiments where the profile information also comprises other information related to depositing, this information is also obtained in step 403. In step 404, the IVR prompts the subscriber for voucher identification ID. The voucher identification number ID is received in step 405. The validity of the voucher is checked (not shown in FIG. 4) and after that, in step 406, the IVR determines the type T of voucher e.g. by using the identification number and going through list(s) in order to find out the types. After the voucher type T is determined, the IVR checks, in step 407, if the voucher type is an allowed one. In other words, the IVR checks whether the type T belongs to the allowed voucher types VTas. If so, the IVR continues depositing in step 408, the detailed steps of which are not shown in FIG. 4. The depositing is carried out according to prior art, but in the future the depositing may also be carried out by new depositing methods not known today. If the deposit was carried out (step 409), in step 410 the IVR sets in the subscriber information the voucher type currently in use VTu to voucher type T and then ends the depositing in step 411, the detailed steps of which are not shown in FIG. 4.

If the deposit is not carried out (step 409), e.g. because the caller changes his mind due to losing current credit, then the IVR gives an audio message "goodbye" in step 412 and no subscriber-related information is changed. The call is disconnected.

If the voucher which the caller is trying to deposit is not one of the allowed voucher types (step 407), then the IVR quits without doing any updating and gives in step 412 an audio message telling that the voucher type the caller is trying to deposit, is not an allowed one. The IVR also gives in the audio message the allowed voucher types VTas in step 412.

In some other embodiments of the invention the IVR may send the MSISDN to the SMP, and the SMP performs the data search described in steps 402 and 403 and sends as a response to the SCP the allowed voucher types VTas.

The steps have not been set out in absolute time sequence in FIGS. 3 and 4. Some of the above steps may take place simultaneously or in a different order, for example steps 401-403 and 404-406. Some steps may also be skipped, like the step 402 in embodiments where subscriber information comprises allowed voucher types VTas. Other steps not shown in FIGS. 3 and 4 may also occur between the steps stated above. Instead of some steps shown in FIGS. 3 and 4, some other step having the same result, may be performed. For example in some embodiments, step 304 may be replaced by steps where the voucher number currently in use is used for determining the voucher type.

The present invention can be implemented in existing network elements. They all have processors and a memory with which the inventive functionality described below can be implemented. The functions described above may be located in one network element or some of them may be in one element and the others in other elements regardless of how they are located in the examples which illustrate the invention.

Although the invention is described above assuming that the subscriber is a prepaid subscriber and the system is a prepaid system, the invention may be implemented also for conventional subscribers who are charged afterwards. When the implementation involves conventional subscribers, the tariff model identifier is preferably added to the subscriber information stored in the subscriber information database, such as a home location register in the GSM system. It is also possible to use profile definitions with conventional subscribers. This invention is not limited to mobile systems but it may be implemented in any kind of telecommunications system, e.g. fixed systems, storing subscriber information, like the PSTN (Public Switch Telephone Network) or the so called third generation system UMTS (Universal Mobile Telecommunications System) and IMT-2000 (International Mobile Telecommunication 2000). It is also possible to provide prepaid service to fixed subscribers in a similar way as is illustrated here with the above figures.

The accompanying drawings and the description pertaining to them are only intended to illustrate the present invention. Different variations and modifications to the invention will be apparent to those skilled in the art, without departing from the scope and spirit of the invention defined in the appended claims.

The invention claimed is:

1. A method comprising:
receiving a request to credit a prepaid account associated with a subscriber, where the request indicates a particular tariff scheme from a plurality of tariff schemes, where a tariff scheme defines how calls are to be charged;
in response to crediting the prepaid account according to the request, setting a current tariff scheme associated with the subscriber to be the particular tariff scheme;
in response to a call being initiated by a subscriber, determining, by a processor, the current tariff scheme; and
charging the prepaid account for the call based at least in part on the current tariff scheme.

2. The method of claim 1, where determining the current tariff scheme comprises:
determining a current tariff model associated with the subscriber from a plurality of tariff models, where a tariff model comprises at least one tariff scheme; and
determining the current tariff scheme from the at least one tariff scheme in the current tariff model.

3. The method of claim 2, where determining the current tariff scheme from the at least one tariff scheme is based at least in part on at least one of: a current time, a current day and a number being called.

4. The method of claim 1, where setting the current tariff scheme associated with the subscriber comprises setting a current tariff model associated with the subscriber from a plurality of tariff models, where a tariff model comprises at least one tariff scheme.

5. The method of claim 1, where the request comprises a voucher identifier and the particular tariff scheme is a tariff scheme associated with the voucher identifier.

6. The method of claim 5, where the voucher identifier is associated with a voucher type, and the method further comprises:

determining whether the voucher type is an allowed voucher type for the prepaid account; and
in response to determining that the voucher type is an allowed voucher type, crediting the prepaid account.

7. The method of claim 6, further comprising in response to determining that the voucher type is not an allowed voucher type, informing the subscriber that the voucher type is not an allowed voucher type.

8. The method of claim 1, where the request to credit the prepaid account is a first request to credit and the particular tariff scheme is a first particular tariff scheme, and the method further comprises:
receiving a second request to credit the prepaid account, where the second request indicates a second particular tariff scheme from the plurality of tariff schemes; and
in response to crediting the prepaid account according to the second request, setting the current tariff scheme associated with the subscriber to be the second particular tariff scheme.

9. The method of claim 8, where the first particular tariff scheme is different from the second particular tariff scheme.

10. An apparatus, comprising at least one processor; and at least one memory including computer program code, the at least one memory and the computer program code configured to, with the at least one processor, cause the apparatus to perform at least the following:
to receive a request to credit a prepaid account associated with a subscriber, where the request indicates a particular tariff scheme from a plurality of tariff schemes, where a tariff scheme defines how calls are to be charged;
in response to crediting the prepaid account according to the request, to set a current tariff scheme associated with the subscriber to be the particular tariff scheme;
in response to a call being initiated by a subscriber, to determine the current tariff scheme; and
to charge the prepaid account for the call based at least in part on the current tariff scheme.

11. The apparatus of claim 10, where, when determining the current tariff scheme, the at least one memory and the computer program code are further configured to cause the apparatus:
to determine a current tariff model associated with the subscriber from a plurality of tariff models, where a tariff model comprises at least one tariff scheme; and
to determine the current tariff scheme from the at least one tariff scheme in the current tariff model.

12. The apparatus of claim 11, where determining the current tariff scheme from the at least one tariff scheme is based at least in part on at least one of a current time, a current day and a number being called.

13. The apparatus of claim 10, where setting the current tariff scheme associated with the subscriber comprises setting a current tariff model associated with the subscriber from a plurality of tariff models, where a tariff model comprises at least one tariff scheme.

14. The apparatus of claim 10, where the request comprises a voucher identifier and the particular tariff scheme is a tariff scheme associated with the voucher identifier.

15. The apparatus of claim 14, where the voucher identifier is associated with a voucher type, and the apparatus further comprises:
determining whether the voucher type is an allowed voucher type for the prepaid account; and
in response to determining that the voucher type is an allowed voucher type, crediting the prepaid account.

16. The apparatus of claim 15, where the at least one memory and the computer program code are further configured to cause the apparatus, in response to determining that the voucher type is not an allowed voucher type, to inform the subscriber that the voucher type is not an allowed voucher type.

17. The apparatus of claim 10, where the request to credit the prepaid account is a first request to credit and the particular tariff scheme is a first particular tariff scheme, and the at least one memory and the computer program code are further configured to cause the apparatus:

to receive a second request to credit the prepaid account, where the second request indicates a second particular tariff scheme from the plurality of tariff schemes; and to set the current tariff scheme associated with the subscriber to be the second particular tariff scheme in response to crediting the prepaid account according to the second request.

18. The apparatus of claim 10, where the first particular tariff scheme is different from the second particular tariff scheme.

19. The apparatus of claim 10, where the apparatus is embodied in a wireless network node.

20. An apparatus comprising:

means for receiving a request to credit a prepaid account associated with a subscriber, where a voucher is used to credit the prepaid account and the request comprises a voucher identifier for the voucher, where the voucher identifier is associated with a voucher type that is associated with a particular tariff scheme from a plurality of tariff schemes, where a tariff scheme defines at least one price per minute for charging calls;

means for determining whether the voucher type is an allowed voucher type for the prepaid account in response to receiving the request;

means for crediting the prepaid account according to the request in response to determining that the voucher type is an allowed voucher type means for setting a current tariff scheme associated with the subscriber to be the particular tariff scheme associated with the voucher identifier in response to crediting the prepaid account according to the request;

means for determining the current tariff scheme in response to a call being initiated by a subscriber; and means for charging the prepaid account for the call based at least in part on the current tariff scheme.

21. The apparatus of claim 20, where the means for determining the current tariff scheme comprises:

means for determining a current tariff model associated with the subscriber from a plurality of tariff models, where a tariff model comprises at least one tariff scheme; and means for determining the current tariff scheme from the at least one tariff scheme in the current tariff model.

22. The apparatus of claim 21, where determining the current tariff scheme from the at least one tariff scheme is based at least in part on at least one of: a current time, a current day and a number being called.

23. The apparatus of claim 20, where the means for setting the current tariff scheme associated with the subscriber comprises means for setting a current tariff model associated with the subscriber from a plurality of tariff models, where a tariff model comprises at least one tariff scheme.

* * * * *